Aug. 28, 1928.
W. A. GIBBS
1,682,612
ANIMAL TRAP
Filed April 5, 1924    2 Sheets-Sheet 2
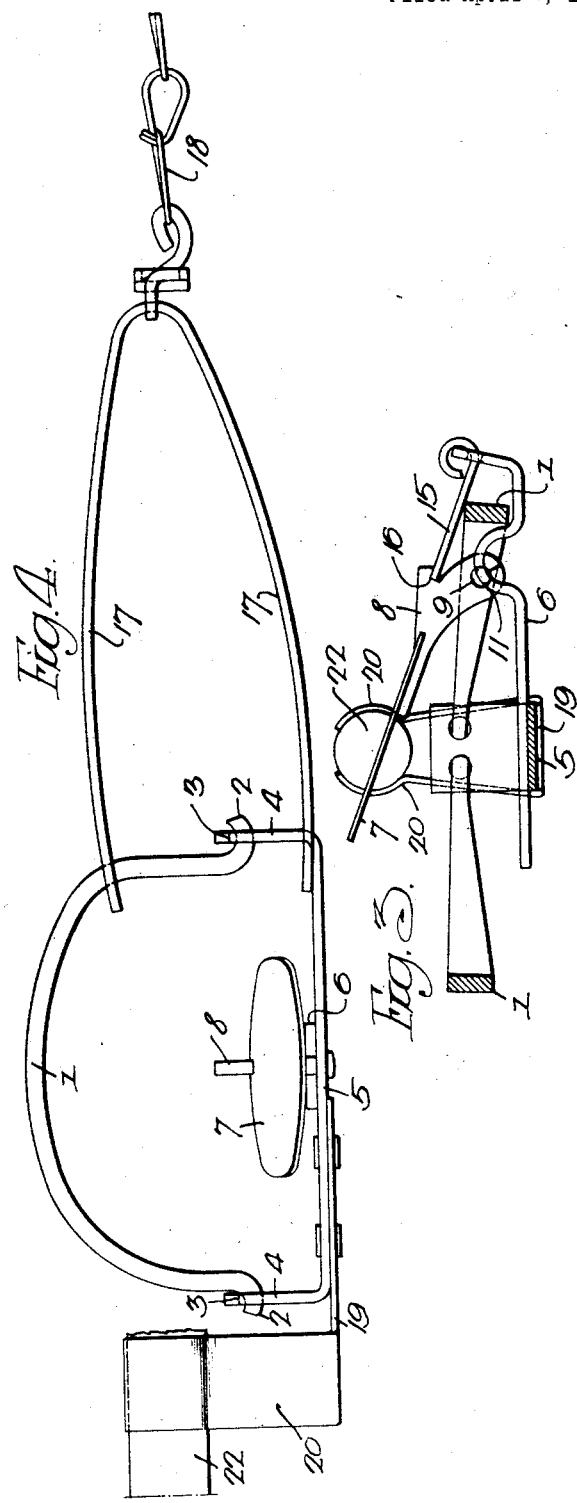
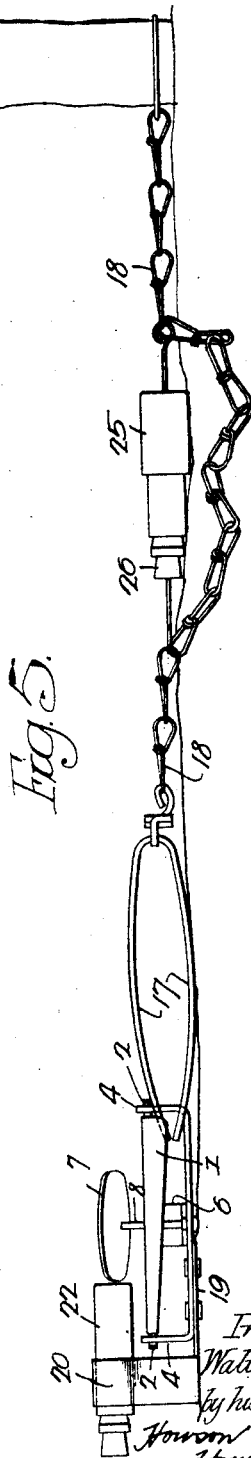
Inventor
Walter A. Gibbs
by his Attorneys
Howson & Howson Patented Aug. 28, 1928.

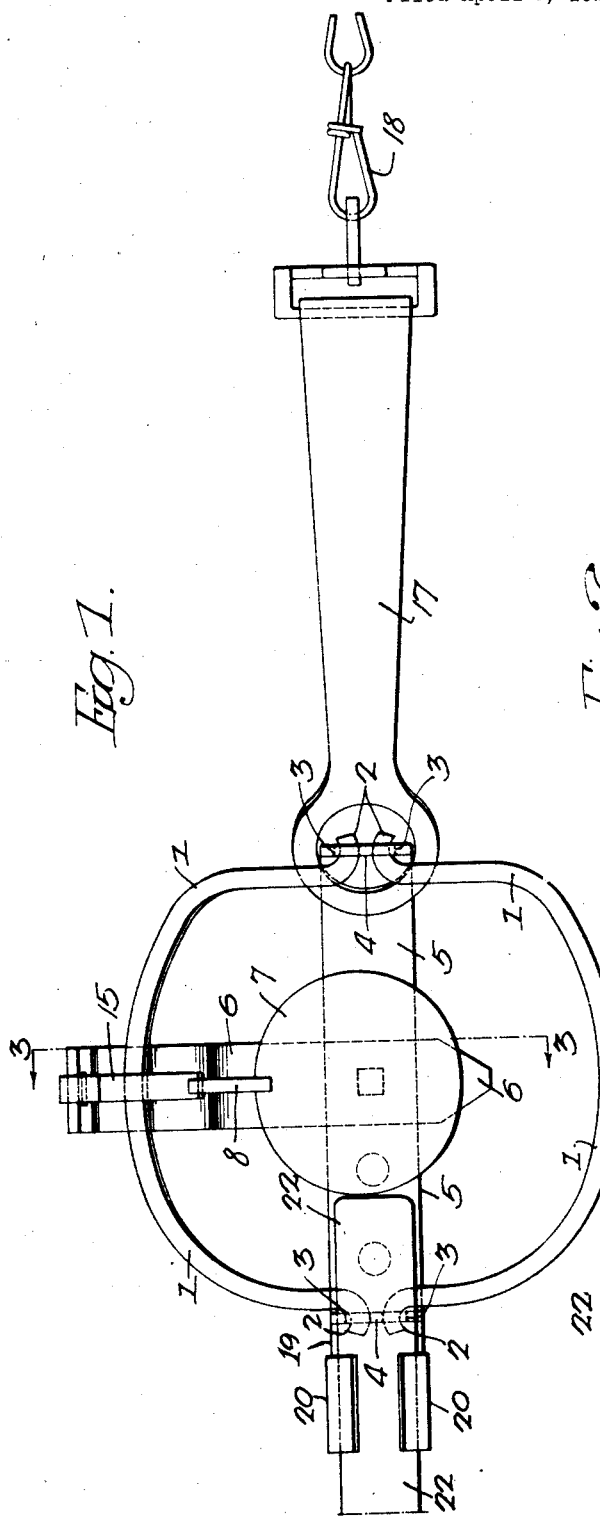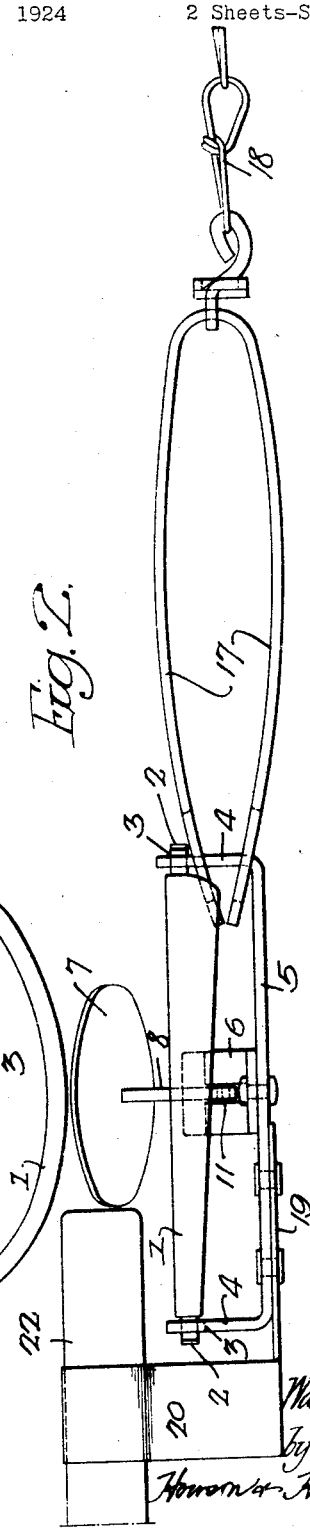

1,682,612

UNITED STATES PATENT OFFICE.

WALTER A. GIBBS, OF HOLLY OAK, DELAWARE.

ANIMAL TRAP.

Application filed April 5, 1924. Serial No. 704,429.

The principal object of this invention is to provide an animal trap which not only is more humane than traps of the usual form by reason of rendering an animal caught therein insensible to pain, but which also is more efficient in operation owing to the provision of extra means tending to prevent escape of the animal.

More particularly the invention resides in the provision of effective and practical means for administering to an animal anesthetizing or lethal gases, vapors or fumes or other gaseous substance having the desired effect upon the animal.

Primarily it is contemplated to employ said means in connection with mechanical trapping or gripping elements, although in its broader phase, the invention is not so limited since obviously, the "gasing" means may be utilized independent of other trapping elements.

Further important features of the invention reside in the animal actuated means for releasing the gas or vapor, and in the other novel features and details of construction hereinafter set forth.

In the attached drawings:—

Fig. 1 is a plan view of a trap made in accordance with my invention;

Fig. 2 is a side elevation of the trap;

Fig. 3 is a section on the line 3—3, Fig. 1;

Fig. 4 is a side elevation of the trap after being sprung; and,

Fig. 5 is a side elevation of a trap showing a modification within the scope of the invention.

For purposes of illustration, I have illustrated a simple form of jaw trap; but it will be understood that the invention in principle is applicable to any form of trap, and means for applying the invention to other types of trap will present themselves readily to those acquainted with the art. The trap illustrated comprises a pair of swinging and cooperating jaws 1, 1, whose out turned ends 2, 2 are journaled in suitable apertures 3, 3, in the upright parts 4, 4, of a base or frame element 5. The said base or frame also comprises a cross element 6 on which is pivotally mounted a treadle 7. The treadle comprises an arm 8 apertured at 9 for reception of a pivot pin 11.

The outer end of the element 6 is upturned and carries loosely therein a latch element 15 whose free end is adapted to engage in a notch 16 in the arm 8 for a purpose hereinafter described.

The trap also comprises a jaw closing spring 17 of well known form which operates on both jaws to bring them from a spread or "set" position, in which they are substantially horizontal, to the closed or sprung position shown in Fig. 4. As illustrated, the spring may have attached thereto a retaining chain 18, although obviously this chain may attach to any other suitable part of the trap, and does not necessarily constitute an essential element.

As best shown in Fig. 3, the latch 15 when overlying one of the jaws and with its free end engaged in the notch 16 will retain the jaws in "set" position, and will release the jaws only when the treadle 7 is depressed.

Extending from that end of the element 5 opposite the spring is a bracket 19 which carries a clamp 20 adapted to hold a bottle or other container. In the present instance, the clamp is adapted to retain a cylindrical vial 22, preferably of glass or similar destructible material, and the gripping portion of the clamp is so placed that a retained container may project between the jaws 1, 1, so that the latter in closing will strike and break the said container. Obviously, the container may be of any form desired and the holding means will be formed accordingly.

It will be noticed that animal actuated means releases the gases, which in this instance are held in the container, and further that the closing movement of the animal gripping elements is utilized to accomplish said release.

The release of the gas may be accomplished in other ways than by rupture of a container, and there is to be no limitation as to the means by which this may be accomplished. One alternate way is illustrated in Fig. 5, in which a container 25 is secured to the chain 18, while the closure 26 for the container in the form, for example, of a cork is also secured to the chain but with sufficient slack to insure withdrawal from the container when the chain is made taut, as would be the case when an animal caught in the trap would attempt to move away with the trap. The arrangement is such, however, that withdrawal of the stopper does not effect the chain which remains intact.

Many devices and combinations of elements may be used to accomplish the desired results.

It is not necessary, for example, to provide mechanical means for releasing the gases, since many animals will bite and chew anything connected with a trap or fastening which holds them, particularly if their attention is in some way attracted, and the container or other source of gas supply can readily be so arranged as to be opened or ruptured or otherwise rendered effective in this manner. Furthermore, the gas containing or supplying elements may have no physical connection with trap; or they may be in the form of a separate attachment connected with the trap only by an actuating cord or other element. It will also be apparent that the invention is not limited to any particular method for supplying the gas, and instead of a container, I may utilize materials capable of generating gas under conditions brought about directly or indirectly by the animal.

I claim:

1. An animal trap comprising a pair of U-shaped cooperating pivoted jaws, springs for bringing said jaws together, and a container arranged between the jaws adjacent the pivots and adapted to be engaged on opposite sides by the side arms of the U-shaped jaws when the latter are brought together.

2. An animal trap comprising means for gripping and holding an animal, means for restricting the movement of the trap by the gripped animal, and a vaporous drug container operatively associated with the means for restricting the movement of the trap so as to be ruptured by the moving of the trap by the gripped animal.

3. In an animal trap the combination with animal gripping mechanism of a gas vaporous drug supply, and means adapted to be rendered effective by the gripped animal to liberate the gas for inhalation by the animal.

4. The combination with an animal trap including a base and a pair of spring actuated jaws mounted on spaced pivots at opposite ends of the base, of a vaporous drug container operatively associated with the trap and positioned above the base over one pair of spaced pivots and within the path of movement of the jaws, whereby the container is ruptured by the jaws during their closing movements.

5. The combination with an animal trap including a base and a pair of spring actuated jaws pivotally mounted on the base, of a vaporous drug container operatively associated with the trap and mounted above the jaw pivots within the path of movement of the jaws, said container being positioned nearer to the jaw pivots than to the free ends of the jaws, whereby the container is ruptured during the initial closing movement of the trap.

6. The combination in an animal trap of a base, animal gripping means including a U-shaped spring actuated jaw pivoted on the base, an opposing element cooperating with the jaw to grip the animal, means for setting and releasing the trap, and a vaporous drug container operatively associated with the trap so as to be ruptured by the side arm of the U-shaped jaw during the closing movement of the trap.

7. The combination with an animal trap including a base and coacting U-shaped jaws pivotally mounted on the base, a spring for closing the jaws and means for setting and releasing the trap, of a vaporous drug container operatively associated with the trap so as to be ruptured by the side arms of the U-shaped jaws during the closing movements of the trap.

WALTER A. GIBBS.